US009528651B2

(12) United States Patent
Hsu

(10) Patent No.: US 9,528,651 B2
(45) Date of Patent: Dec. 27, 2016

(54) INTRADUCTAL POWER VEHICLE

(71) Applicant: Hsih-Hsiao Hsu, Taipei (TW)

(72) Inventor: Hsih-Hsiao Hsu, Taipei (TW)

(*) Notice: Subject to any disclaimer, the term of this patent is extended or adjusted under 35 U.S.C. 154(b) by 0 days.

(21) Appl. No.: 14/676,136

(22) Filed: Apr. 1, 2015

(65) Prior Publication Data
US 2015/0285424 A1   Oct. 8, 2015

(30) Foreign Application Priority Data
Apr. 2, 2014 (TW) .............................. 103205682 U

(51) Int. Cl.
*F16L 55/32* (2006.01)
*F16L 55/40* (2006.01)

(52) U.S. Cl.
CPC ................ *F16L 55/32* (2013.01); *F16L 55/40* (2013.01)

(58) Field of Classification Search
CPC ............. F16L 55/26; F16L 55/32; F16L 55/40
USPC ........................................... 104/138.1, 138.2
See application file for complete search history.

(56) References Cited

U.S. PATENT DOCUMENTS

| 4,838,170 A * | 6/1989 | Illakowicz .............. B61C 13/00 |
| | | 104/138.2 |
| 4,852,391 A * | 8/1989 | Ruch ................... F16L 55/1283 |
| | | 104/138.2 |
| 2004/0173116 A1* | 9/2004 | Ghorbel ................. F16L 55/26 |
| | | 104/138.2 |

* cited by examiner

Primary Examiner — Zachary Kuhfuss
(74) Attorney, Agent, or Firm — Muncy, Geissler, Olds & Lowe, P.C.

(57) ABSTRACT

An intraductal power vehicle operated inside a tubular tunnel having an inner circumference includes at least a main vehicle body, a power wheel, an elastic wheel, an auxiliary wheel and a drive module. The main vehicle body extended between a first and a second end faces along a central axis has a vehicle circumference. The power wheel is mounted to a first circumferential portion of the vehicle circumference. The elastic wheel is mounted to a second circumferential portion of the vehicle circumference. The second circumferential portion and the first circumferential portion are separated to opposing sides of the central axis. The auxiliary wheel is located on the vehicle circumference at a position closer to the second end face than the power wheel and the elastic wheel. The drive module for driving at least one of the power wheel and the auxiliary wheel is located inside the main vehicle body.

6 Claims, 8 Drawing Sheets

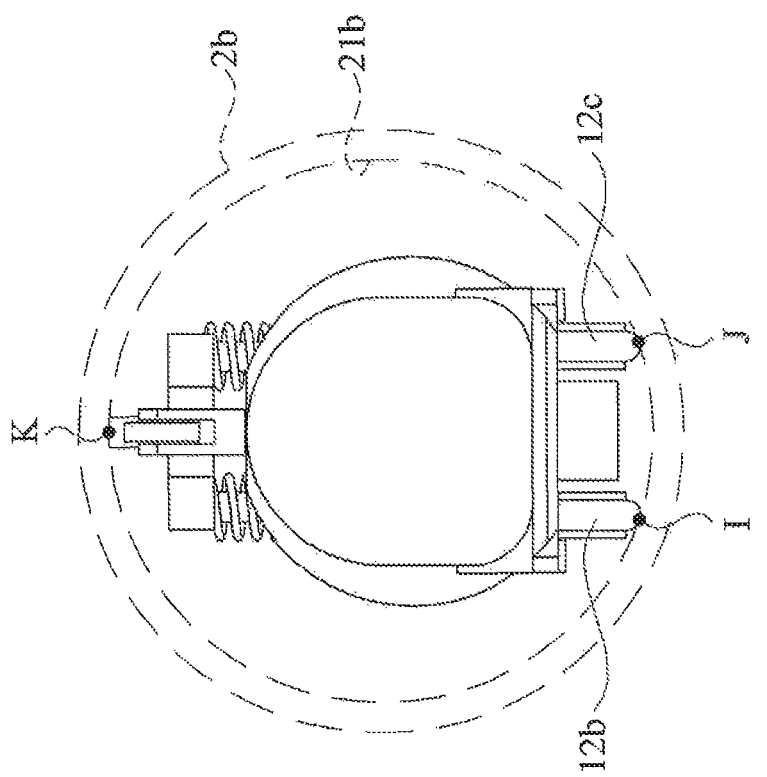

INTRADUCTAL POWER VEHICLE

This application claims the benefit of Taiwan Patent Application Serial No. 103205682 filed on Apr. 2, 2014, the subject matter of which is incorporated herein by reference.

BACKGROUND OF INVENTION

1. Field of the Invention

The invention relates to an intraductal power vehicle, and more particularly to the intraductal power vehicle that can be operated in a tubular tunnel.

2. Description of the Prior Art

The mini 4-wheel-drive (4WD) car has been one of popular toys to the children for years. Generally speaking, the mini 4WD car is structured to include an internal hi-torque motor and to drive four wheels simultaneously through a gear set, so as to enable the cars to race along a ⊔-shape orbit.

Nevertheless, since the structural limitations of the mini 4WD car in requiring front and rear guide wheels and in needing a bigger size tire over the car body, the dimension of the ⊔-shape orbit cannot be reduced. Further, because the mini 4WD car is made up by rigid materials, the versatility in orbits for racing is hardly upgraded. Thereby, people usually lose their enthusiasms for the racing. In addition, the structuring of the conventional mini 4WD car does limit its application to other type of orbits, such as a tubular tunnel.

SUMMARY OF THE INVENTION

Accordingly, in view of the aforesaid limitations in orbit applications and selections for the conventional mini 4WD cars, it is the primary object of the present invention to provide an intraductal power vehicle that includes power wheels, elastic wheels and auxiliary wheels so as to be operated smoothly in an orbit shaped as a tubular tunnel.

In the present invention, the intraductal power vehicle operated inside a tubular tunnel having an inner circumference includes a main vehicle body, at least one power wheel, at least one elastic wheel, at least one auxiliary wheel and at least one drive module. The main vehicle body extended from a first end face to a second end face along a central axis further has a vehicle circumference located between the first end face and the second end face. The at least one power wheel is mounted to a first circumferential portion of the vehicle circumference. The at least one elastic wheel is mounted to a second circumferential portion of the vehicle circumference. The second circumferential portion and the first circumferential portion are separated to opposing sides of the central axis. The at least one auxiliary wheel is located on the vehicle circumference at corresponding at least one position closer to the second end face than the at least one power wheel and the at least one elastic wheel. The at least one drive module for driving at least one of the at least one power wheel and the at least one auxiliary wheel is located inside the main vehicle body. When the intraductal power vehicle is operated inside the tubular tunnel, the at least one auxiliary wheel contacts at correspondingly at least one floating contact point on the inner circumference in a floating manner, the at least one power wheel and the at least one elastic wheel are constantly and simultaneously contacted with the inner circumference at respective constant contact points, two of the constant contact points and one of the at least one floating contact point form integrally an obtuse angled triangular projection on a projection surface perpendicular to the central axis, and thereby the intraductal power vehicle is able to be steadily operated inside the tubular tunnel.

In one embodiment of the present invention, the drive module is one of a motor and a spiral spring, the drive module is mechanically connected with at least one of the at least one power wheel and the at least one auxiliary wheel, and the at least one auxiliary wheel is located at the first circumferential portion of the vehicle circumference. Further, a centerline of the at least one power wheel is spaced to the first end face by a first distance, a centerline of the at least one elastic wheel is spaced to the first end face by a second distance, and the first distance is equal to the second distance.

In one embodiment of the present invention, a centerline of the at least one power wheel is spaced to the first end face by a first distance, a centerline of the at least one elastic wheel is spaced to the first end face by a second distance, the first distance is smaller than the second distance, and the at least one auxiliary wheel is located at the first circumferential portion of the vehicle circumference.

In one embodiment of the present invention, a centerline of the at least one power wheel is spaced to the first end face by a first distance, a centerline of the at least one elastic wheel is spaced to the first end face by a second distance, the first distance is larger than the second distance, and the at least one auxiliary wheel is located at the second circumferential portion of the vehicle circumference By providing the intraductal power vehicle in accordance with the present invention, since the power wheel is introduced to drive the intraductal power vehicle, the obtuse angled triangular formation by the elastic wheel, the power wheel and the auxiliary wheel on the inner circumference of the tubular tunnel would ensure the intraductal power vehicle to be stably and steadily operated inside the tubular tunnel, such that the aforesaid problems for the conventional 4WD car can be substantially resolved.

All these objects are achieved by the intraductal power vehicle described below.

BRIEF DESCRIPTION OF THE DRAWINGS

The present invention will now be specified with reference to its preferred embodiment illustrated in the drawings, in which:

FIG. 8 is a front side view of FIG. 7.

DESCRIPTION OF THE PREFERRED EMBODIMENT

The invention disclosed herein is directed to an intraductal power vehicle. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
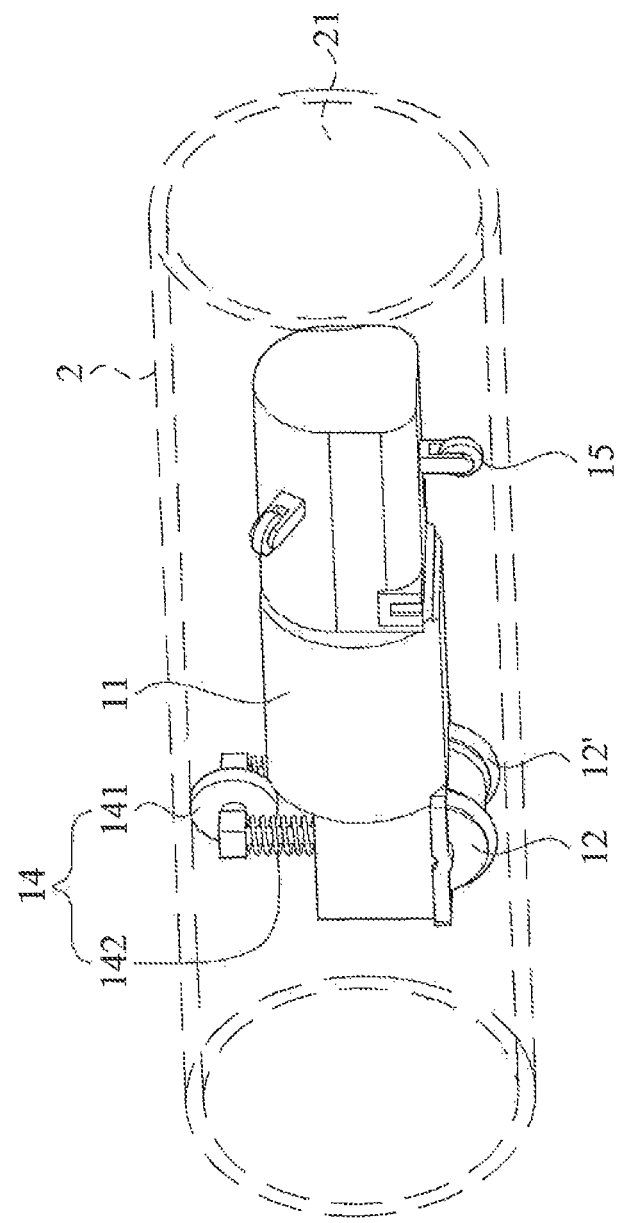
FIG. 1 is a schematically perspective view of a first embodiment of the intraductal power vehicle in accordance with the present invention, at a state in a tubular tunnel.
Figure 2:
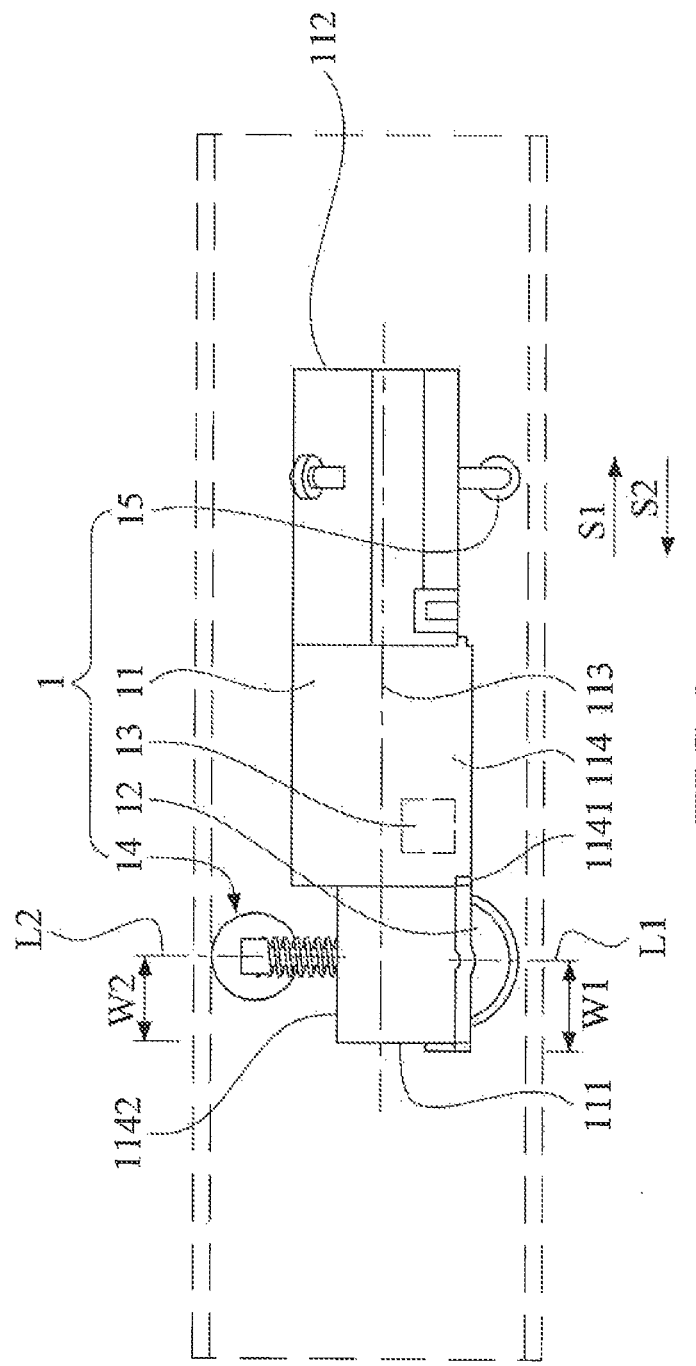
FIG. 2 is a lateral side view of FIG. 1.
Figure 3:
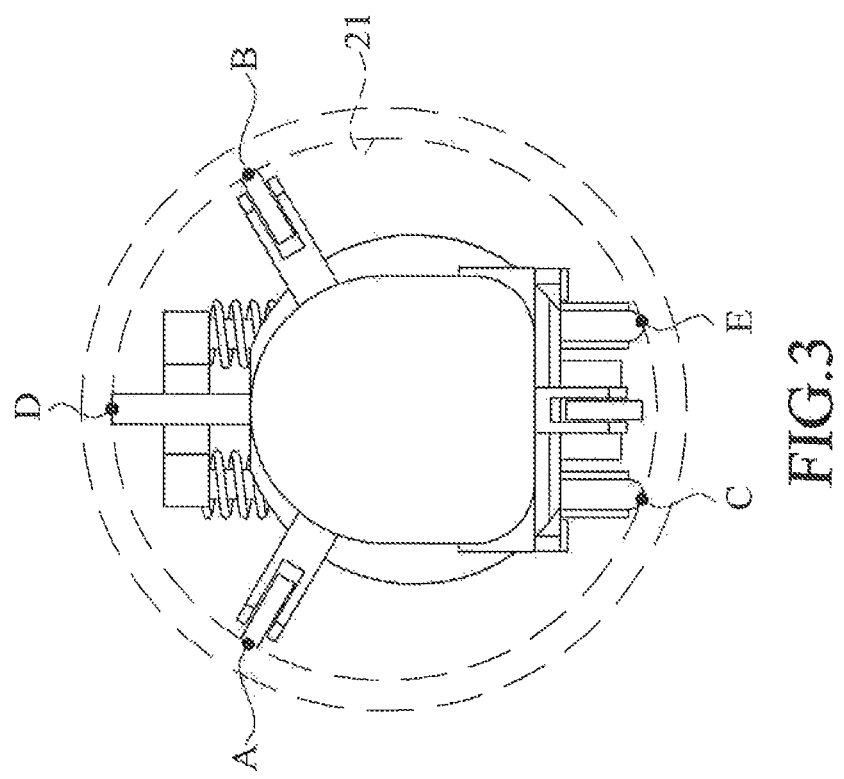
FIG. 3 is a front side view of FIG. 1.
Figure 4:
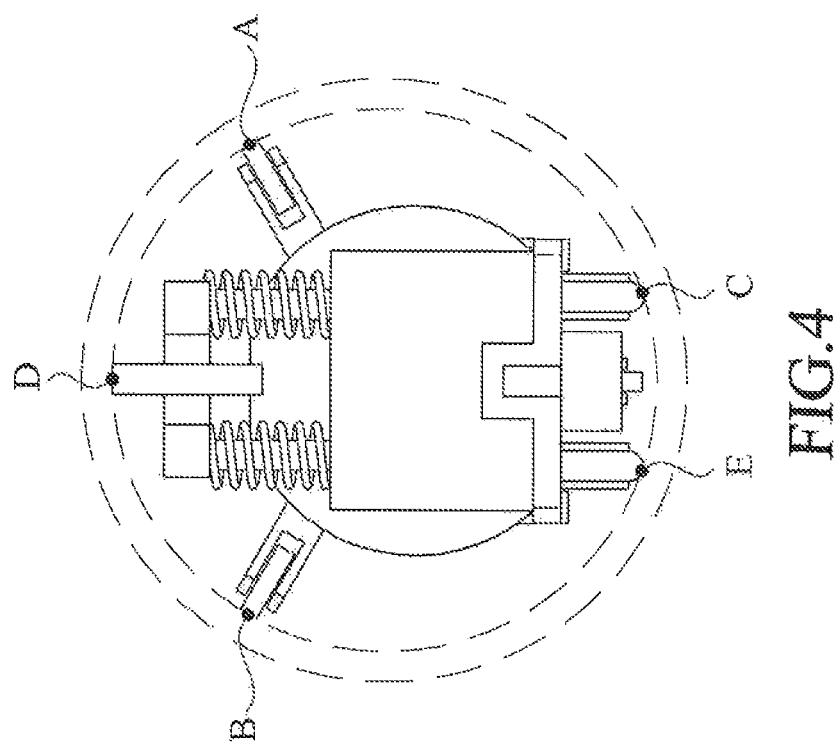
FIG. 4 is a rear side view of FIG. 1.

Refer now to FIG. 1 to FIG. 4, in which FIG. 1 is a schematically perspective view of a first embodiment of the intraductal power vehicle in accordance with the present invention, at a state in a tubular tunnel, FIG. 2 is a lateral side view of FIG. 1, FIG. 3 is a front side view of FIG. 1, and FIG. 4 is a rear side view of FIG. 1.

As shown, the intraductal power vehicle 1 is to be operated inside a tubular tunnel 2, in which the tubular tunnel 2 has an inner circumference 21. Preferably, the tubular tunnel 2 has a pipe-shape cross section. While in other embodiments not shown here, the cross section of the tubular tunnel 2 can be a square, a rectangle, a triangle or any the like.

The intraductal power vehicle 1 includes a main vehicle body 11, at least one power wheel (two 12, 12' shown in this embodiment), at least one drive module 13, at least one elastic wheel 14 and at least one auxiliary wheel 15 (three shown in this embodiment, and only one labeled). In the present invention, the main vehicle body 11 can be a circular-pipe shape, an oval shape, a rectangular shape, a triangular shape or any the like. In this first embodiment, the main vehicle body 11 is shaped as a quasi-circular pipe so as to be easily operated inside the tubular tunnel 2.

Further, the main vehicle body 11 has a first end face 111 and a second end face 112. In this description for the following embodiments, the term "end face" stands for the left-end or right-end portion of the main vehicle body 11 shown in FIG. 2, labeled as 111 or 112, respectively. The main vehicle body 11, extending from the first end face 111 to the second end face 112 along a central axis 113 (i.e. the first end face 111 and the second end face 112 are located at opposing ends of the central axis 113), has a vehicle circumference 114 formed between the first end face 111 and the second end face 112. In this present invention, the central axis 113 is the specific centerline of the main vehicle body 11 that has the largest span. In this embodiment, the central axis 113 is the middle centerline extending longitudinally along the main vehicle body 11.

In addition, the vehicle circumference 114 defined as the exterior circumferential portion of the main vehicle body 11 further has a first circumferential portion 1141 and a second circumferential portion 1142, in which the first circumferential portion 1141 is particularly the lower portion of the main vehicle body 11 and the second circumferential portion is the upper portion of the main vehicle body 11 (as shown in FIG. 2). Namely, the second circumferential portion 1142 and the first circumferential portion 1141 are separated to opposing sides of the central axis 113.

The power wheels 12 and 12' are mounted to the first circumferential portion 1141 of the vehicle circumference 114, with a portion thereof located inside the main vehicle body 11. It is noted that, though two power wheels 12, 12' are included in this first embodiment, yet, in some other embodiments, these two power wheel 12, 12' can be replaced by a wheel with a broader width. The power wheel 12 or 12' can be, but not limited to be, made of a plastic or a resin. In the following description, the description upon the power wheel 12 can be exactly and directly applied to the other power wheel 12'. Further, a centerline L1 of the power wheel 12 is spaced to the first end face 111 by a first distance W1 as shown in FIG. 2.

The drive module 13 mounted inside the main vehicle body 11 is mechanically connected with the power wheel 12, in a connection form of gear set or any relevant mechanical coupling means for the drive module 13 to drive the power wheel 12. In this first embodiment, the drive module 13 is located inside the main vehicle body 11. However, in some other embodiments, the drive module 13 can be alternatively disposed externally to the main vehicle body 11. In the present invention, the drive module 13 can be a motor or a spiral spring, namely an electric driving means or a manual driving means.

The elastic wheel 14 mounted to the second circumferential portion 1142 of the vehicle circumference 114 is consisted of a roller 141 and an elastic member 142, in which the elastic member 142 can be a spring to elastically support the roller 141, such that, while the intraductal power vehicle 1 is turned inside a winding tubular tunnel 2, the elastic wheel 14 can compensate elastically the movement of the turning vehicle 1.

Further, in the present invention, the intraductal power vehicle 1 can include more than one elastic wheel 14, and the width of the elastic wheel 14 is decided up to the design requirement of the main vehicle body 11. In addition, a second distance W2 is defined between the center line L2 of the elastic wheel 14 and the first end face 111. In this first embodiment, the first distance W1 is equal to the second distance W2. While in other embodiments, the first distance W1 and the second distance W2 can be arbitrarily. Also, the elastic wheel 14 can be coupled with the drive module 13, such that the depressing upon the elastic wheel 14 (i.e. the elastic member 142) can be led to trigger the drive module 13 to further drive the power wheels 12 and 12'.

The auxiliary wheels 15 are located on the vehicle circumference 114 at appropriate positions closer to the second end face 112 than the power wheels 12, 12' and the elastic wheel 14. In other words, the power wheel 12, 12' and the elastic wheel 14 are located closer to the first end face 111 than the auxiliary wheels 15. With the help of the auxiliary wheels 15, the intraductal power vehicle 1 can move more steadily in the tubular tunnel 2. In addition, it shall be noted that the first embodiment of the present invention includes three auxiliary wheels 15, one located at the first circumferential portion 1141 of the vehicle circumference 114, while another two located aside. In other embodiments, the arrangement of the auxiliary wheels 15 may vary.

In other embodiment of the present invention not shown here, the auxiliary wheel 15 can be further mechanically connected with the drive module 13 so as to allow the drive module 13 to drive the auxiliary wheels 15. Namely, the drive module 13 can couple mechanically at least one of the power wheel 12 and the auxiliary wheel 15. Certainly, the exact arrangement thereof shall depend on the practical requirements.

While in applying the intraductal power vehicle 1 of the present invention, the intraductal power vehicle 1 is firstly inserted into the tubular tunnel 2. At the time while the elastic wheel 14 of the intraductal power vehicle 1 is depressed by the inner circumference 21 so as to allow such an insert, the drive module 13 would be triggered to drive the power wheels 12 and 12' and thus to move the intraductal power vehicle 1 inside the tubular tunnel 2 along a moving direction S1 or S2, in which the moving direction S1 is a backward direction of the intraductal power vehicle 1 and the moving direction S2 is a forward direction of the intraductal power vehicle 1. During that the intraductal power vehicle 1 is stayed inside the tubular tunnel 2, at least one of the two upper auxiliary wheels 15 can contact at the inner circumference 21, say at the corresponding floating contact points A and B as shown in FIG. 3. In this embodiment, the contacting between the two upper auxiliary wheels 15 and the inner circumference 21 is floating. That is to say that the contacting in between may exist or vanish as the intraductal power vehicle 1 is operated inside the tubular tunnel 2 at various operation stages, such as the state of going straight, the state of turning or the state of rolling. As long as the intraductal power vehicle 1 is inside the tubular tunnel 2, the power wheels 12, 12' and the elastic wheel 14 are constantly and simultaneously contacted with the inner circumference 21 at respective constant contact points C, E and D. In particular, one of the constant contact points C and E, the constant contact point D and at least one of the floating contact point A and B can form an obtuse angled triangular projection on a projection surface perpendicular to the central axis 113.

In practice, the aforesaid projection can be viewed by an observing angle resembling to viewing angle for sketching FIG. 3 or FIG. 4. In addition, in this first embodiment, since one of the constant contact points C and E, the constant contact point D and at least one of the floating contact point A and B can be integrally to form an obtuse angled triangle as shown in FIG. 3 or FIG. 4, so the intraductal power vehicle 1 can operate steadily inside the tubular tunnel 2, no matter what type of operational states is for the intraductal power vehicle 1.

It shall be mentioned that the aforesaid obtuse angled triangle can be replaced by a rectangular triangle. However, in the case that an embodiment of the present invention applies a formulation of the rectangular triangle, the operation of the intraductal power vehicle 1 inside the tubular tunnel 2 would be less stable.

Figure 5:
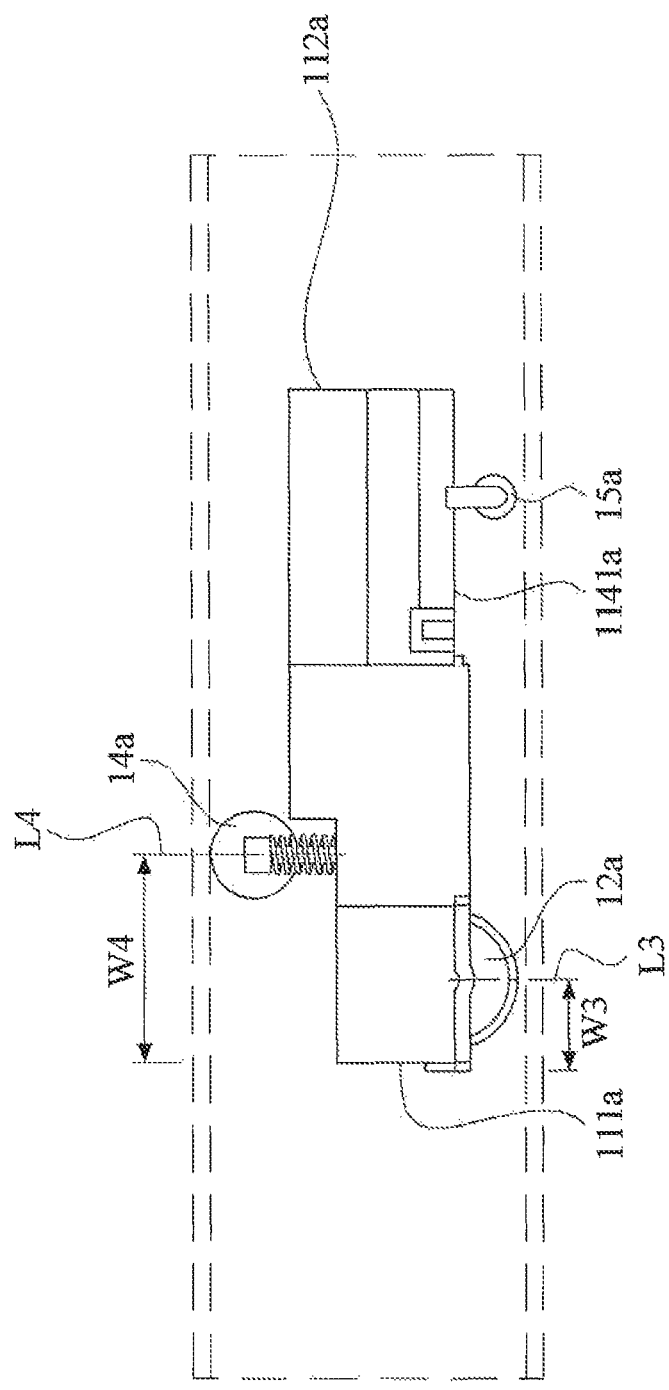
FIG. 5 is a schematically lateral side view of a second embodiment of the intraductal power vehicle in accordance with the present invention, at a state in a tubular tunnel.
Figure 6:
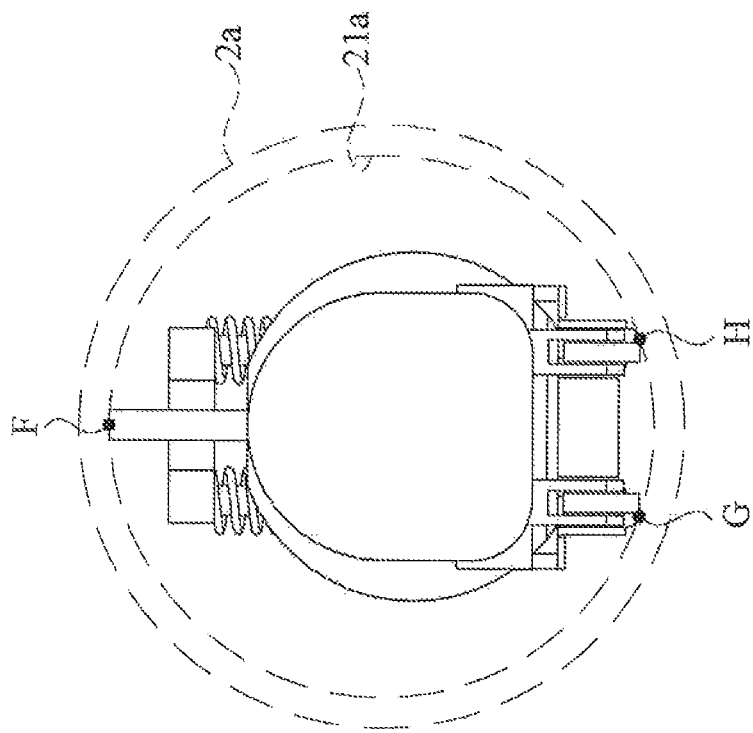
FIG. 6 is a front side view of FIG. 5.

Refer now to FIG. 5 and FIG. 6, in which FIG. 5 is a schematically lateral side view of a second embodiment of the intraductal power vehicle in accordance with the present invention, at a state in a tubular tunnel, and FIG. 6 is a front side view of FIG. 5. As shown, the major difference between the second embodiment and the first embodiment is that this second embodiment includes only two auxiliary wheels 15a (one labeled in the figure), and these two auxiliary wheels 15a are both mounted to the first circumferential portion 1141a; i.e. the same portion that locates the power wheels 12a. In addition, the centerline L3 of the power wheel 12a is spaced to the first end face 111a by a first distance W3, and the centerline L4 of the elastic wheel 14a is spaced to the first end face 111a by a second distance W4. Preferably, the first distance W3 is smaller than the second distance W4, such that the power wheel 12a can locate closer to the first end face 111a, and the elastic wheel 14a can move to close to the center of the vehicle 1.

Similarly, while the second embodiment of the intraductal power vehicle is operated inside the tubular tunnel 2a, two auxiliary wheels 15a can contact in a floating manner at two respective floating contact points on the inner circumference 21a, the elastic wheel 14a can contact constantly at the constant contact point F on the inner circumference 21a, and the two power wheels 12a can also contact at the corresponding constant contact points on the inner circumference 21a, simultaneously. It shall be mentioned that, since the contact points of the auxiliary wheels 15a and the power wheels 12a on the inner circumference 21a would generate overlapping projections on a projection surface perpendicular to the central axis, following explanation would apply simply the floating contact point G and the constant contact points F and H. As shown in FIG. 6, the constant contact points F and H and the floating contact point G are integrally formed as an obtuse angled triangle, such that the intraductal power vehicle can be stably operated inside the tubular tunnel 2a.

Figure 7:
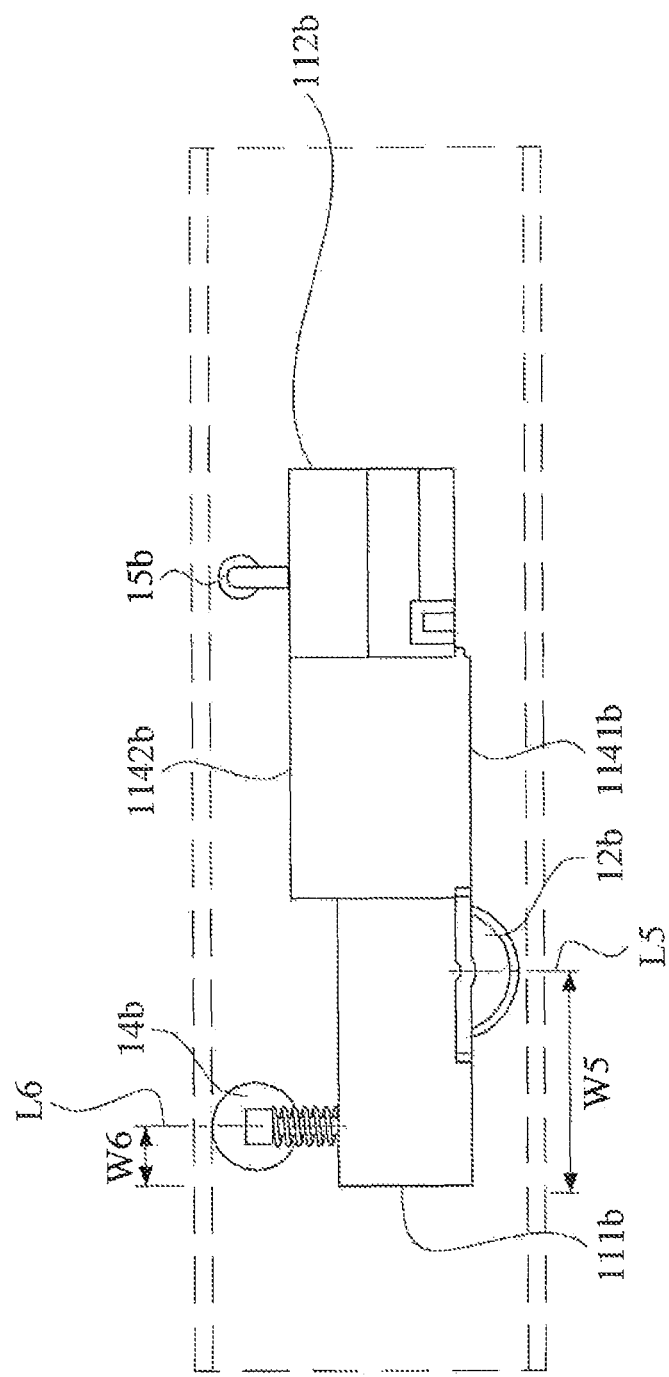
FIG. 7 is a schematically lateral side view of a third embodiment of the intraductal power vehicle in accordance with the present invention, at a state in a tubular tunnel.

Refer now to FIG. 7 and FIG. 8, in which FIG. 7 is a schematically lateral side view of a third embodiment of the intraductal power vehicle in accordance with the present invention, at a state in a tubular tunnel, and FIG. 8 is a front side view of FIG. 7. As shown, the major difference between the third embodiment and the first embodiment is that this third embodiment includes at least two power wheels 12b, 12c (two preferably) on the first circumferential portion 1141b and one auxiliary wheel 15b located on the second circumferential portion 1142b is closer to the second end face 112b. Further, the centerline L5 of the power wheel 12b or 12c is spaced to the first end face 111b by a first distance W5, and the centerline L6 of the elastic wheel 14b is spaced to the first end face 111b by a second distance W6. Preferably, the first distance W5 is larger than the second distance W6, such that the elastic wheel 14b can move closer to the first end face 111b.

Similarly, while the second embodiment of the intraductal power vehicle is operated inside the tubular tunnel 2b, the auxiliary wheel 15b can contact in a floating manner at a respective floating contact point K on the inner circumference 21b, and the power wheels 12b, 12c and the elastic wheel 14b can contact constantly at the respective constant contact points I, J, K (same as the foregoing K) on the inner circumference 21a, simultaneously. As shown in FIG. 8, the constant contact points I, J and the floating contact point K are integrally formed as an obtuse angled triangle, such that the intraductal power vehicle can be stably operated inside the tubular tunnel 2b.

In summary, by providing the intraductal power vehicle in accordance with the present invention, since the power wheel is introduced to drive the intraductal power vehicle, the obtuse angled triangular formation by the elastic wheel, the power wheel and the auxiliary wheel on the inner circumference of the tubular tunnel would ensure the intraductal power vehicle to be stably and steadily operated inside the tubular tunnel, such that the aforesaid problems for the conventional 4WD car can be substantially resolved.

While the present invention has been particularly shown and described with reference to a preferred embodiment, it will be understood by those skilled in the art that various changes in form and detail may be without departing from the spirit and scope of the present invention.

What is claimed is:

1. An intraductal power vehicle, to be operated inside a tubular tunnel having an inner circumference, comprising:
   a main vehicle body, extending from a first end face to a second end face along a central axis, further having a vehicle circumference located between the first end face and the second end face;
   at least one power wheel, mounted to a first circumferential portion of the vehicle circumference;
   at least one elastic wheel, mounted to a second circumferential portion of the vehicle circumference, the second circumferential portion and the first circumferential portion being separated to opposing sides of the central axis;
   at least one auxiliary wheel, located on the vehicle circumference at appropriate positions closer to the second end face than the at least one power wheel and the at least one elastic wheel; and
   at least one drive module, mounted inside the main vehicle body, coupled with the at least one elastic wheel, and being triggered for driving at least one of the at least one power wheel and the at least one auxiliary wheel when the at least one elastic wheel is depressed by the tubular tunnel;

wherein, when the intraductal power vehicle is operated inside the tubular tunnel, the least one auxiliary wheel contacts at correspondingly at least one floating contact point on the inner circumference in a floating manner, the at least one power wheel and the at least one elastic wheel are constantly and simultaneously contacted with the inner circumference at respective constant contact points, two of the constant contact points and one of the at least one floating contact point form integrally an obtuse angled triangular projection on a projection surface perpendicular to the central axis, and thereby the intraductal power vehicle is able to be steadily operated inside the tubular tunnel.

2. The intraductal power vehicle of claim 1, wherein the drive module is one of a motor and a spiral spring.

3. The intraductal power vehicle of claim 1, wherein the drive module is mechanically connected with at least one of the at least one power wheel and the at least one auxiliary wheel.

4. The intraductal power vehicle of claim 1, wherein a centerline of the at least one power wheel is spaced to the first end face by a first distance, a centerline of the at least one elastic wheel is spaced to the first end face by a second distance, and the first distance is equal to the second distance.

5. The intraductal power vehicle of claim 1, wherein a centerline of the at least one power wheel is spaced to the first end face by a first distance, a centerline of the at least one elastic wheel is spaced to the first end face by a second distance, and the first distance is smaller than the second distance.

6. The intraductal power vehicle of claim 1, wherein a centerline of the at least one power wheel is spaced to the first end face by a first distance, a centerline of the at least one elastic wheel is spaced to the first end face by a second distance, and the first distance is larger than the second distance.

* * * * *